US010337865B2

(12) United States Patent
Green et al.

(10) Patent No.: US 10,337,865 B2
(45) Date of Patent: Jul. 2, 2019

(54) GEODETIC SURVEYING SYSTEM (71) Applicant: LEICA GEOSYSTEMS AG, Heerbrugg (CH)

(72) Inventors: Alastair Green, Rebstein (CH); Andreas Daubner, St. Gallen (CH); Paul Dainty, Marbach (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 421 days.

(21) Appl. No.: 14/938,631

(22) Filed: Nov. 11, 2015

(65) Prior Publication Data

US 2016/0138919 A1 May 19, 2016

(30) Foreign Application Priority Data

Nov. 14, 2014 (EP) ..................................... 14193202

(51) Int. Cl.
*G01C 15/00* (2006.01)
*G06T 17/00* (2006.01)
(Continued)

(52) U.S. Cl.
CPC ............ *G01C 15/002* (2013.01); *G06T 17/00* (2013.01); *H04N 5/23245* (2013.01); *H04N 5/23293* (2013.01); *H04N 7/183* (2013.01)

(58) Field of Classification Search
CPC .................................................. G01C 15/002
(Continued)

(56) References Cited

U.S. PATENT DOCUMENTS 5,886,340 A 3/1999 Suzuki et al.
6,072,642 A 6/2000 Shirai
(Continued)

FOREIGN PATENT DOCUMENTS

DE 197 10 722 A1 10/1997
DE 199 26 706 A1 12/1999
(Continued)

OTHER PUBLICATIONS

Extended European Search Report dated Jun. 1, 2015 as received in Application No. 14193202.0.

*Primary Examiner* — Christopher S Kelley
*Assistant Examiner* — Asmamaw G Tarko
(74) *Attorney, Agent, or Firm* — Maschoff Brennan (57) ABSTRACT

A surveying system can have a position determination unit for determining a target position in a defined coordinate system and have a mobile measurement unit for definition and/or position determination of measurement points in the coordinate system. The surveying system may include a control unit for allowing a user to control a surveying task of the surveying system in a surveying environment in order to acquire surveying task data that comprises spatial coordinates of at least one measurement point, the surveying system being adapted to capture and/or receive environment data of the surveying environment, the control unit comprising a processor unit, a data storage unit and an electronic graphical display for displaying a visualization of the surveying task data to the user, wherein the control unit is adapted to provide a virtual walkthrough functionality in a three-dimensional representation of the surveying environment.

21 Claims, 7 Drawing Sheets

(51) Int. Cl.
*H04N 5/232* (2006.01)
*H04N 7/18* (2006.01)

(58) Field of Classification Search
USPC .......................................................... 348/135
See application file for complete search history.

(56) References Cited

U.S. PATENT DOCUMENTS

| | | | |
|---|---|---|---|
| 6,433,858 | B1 | 8/2002 | Suzuki |
| 7,583,373 | B2 | 9/2009 | Schwarz |
| 7,804,051 | B2 | 9/2010 | Hingerling et al. |
| 9,758,239 | B2 | 9/2017 | Metzler et al. |
| 2008/0049012 | A1* | 2/2008 | Bar-Joseph ............ G06T 19/00 345/419 |
| 2014/0163775 | A1* | 6/2014 | Metzler ................ G01C 15/002 701/2 |
| 2014/0226006 | A1* | 8/2014 | Lienhart .................. G01C 1/04 348/135 |
| 2014/0232859 | A1* | 8/2014 | Kotzur ..................... G01C 1/04 348/135 |
| 2014/0232864 | A1* | 8/2014 | Slusarek ................ G01C 15/00 348/143 |

FOREIGN PATENT DOCUMENTS

| | | |
|---|---|---|
| DE | 199 49 580 A1 | 4/2000 |
| EP | 1 686 350 A1 | 8/2006 |
| EP | 1 734 336 A1 | 12/2006 |
| EP | 1 573 271 B1 | 2/2008 |
| EP | 2 511 781 A1 | 10/2012 |
| WO | 2015/169338 A1 | 11/2015 |

\* cited by examiner

GEODETIC SURVEYING SYSTEM

FIELD

The invention relates to a surveying system having a position determination unit, in particular a theodolite or a total station, for determining a target position in a defined coordinate system, and having a mobile measurement unit, equipped with a surveying pole, for definition and/or position determination of measurement points in a defined coordinate system. The surveying system has a control unit that is adapted to dynamically display a 3D model of the surveying environment.

BACKGROUND

Various geodetic surveying apparatuses have been known since ancient times for surveying one or more measurement points. In this case, as a standard, spatial data, distance and direction, or angle from a measuring apparatus to the measurement point to be surveyed are recorded. In particular, the absolute position of the measuring apparatus is acquired together with possibly existing reference points.

Widely known examples of such geodetic surveying apparatuses comprise theodolites, tachymeters or total stations, which are also referred to as electronic tachymeters or computer tachymeters. A geodetic surveying instrument of the prior art is described, for example, in the publication document EP 1 686 350. Such apparatuses have electro sensor angle and distance measurement functions, which allow determination of direction and distance to a selected target. The angle and distance quantities are in this case determined in the internal reference system of the apparatus and, for an absolute position determination, may possibly also need to be correlated with an external reference system.

In many geodetic applications, points are surveyed by placing specially configured target objects at them. These usually consist of a pole having a targetable marking or a reflector for defining the measurement distance, or the measurement point. Using a central geodetic surveying apparatus, even a relatively large number of target objects can therefore be surveyed, although this requires that they be identified. In such surveying tasks, in order to control the measurement process and establish or register measurement parameters, various data, instructions, words and other information need to be transmitted between the target object—in particular a handholdable data acquisition apparatus at the target object—and the central measuring apparatus. Examples of such data are the identification of the target object, inclination of the pole, height of the reflector above ground, reflector constants or measurement values such as temperature or air pressure.

Modern total stations have microprocessors for the digital post-processing and storage of acquired measurement data. The apparatuses are generally produced in a compact and integrated design, usually with coaxial distance and angle measurement elements as well as calculation, control and storage units integrated in an apparatus. Depending on the development level of the total station, means for motorizing the target optics, for reflectorless distance measurement, for automatic target search and tracking and for remote control of the entire apparatus are integrated. Total stations known from the prior art furthermore have a radio data interface for setting up a radio link to external peripheral components, for example to a data acquisition apparatus which, in particular, may be formed as a handholdable data logger, remote control unit, array processor, notebook, small computer or PDA. By means of the data interface, measurement data acquired and stored by the total station can be output to external postprocessing, externally acquired measurement data can be read into the total station for storage and/or post-processing, remote control signals for remote control of the total station or of another external component, particularly in mobile field use, can be input or output, and control software can be transferred into the total station.

For sighting or targeting the measurement point to be surveyed, geodetic surveying apparatuses according to the generic type comprise, for example, a target telescope, for example an optical telescope, as a sighting device. The target telescope can generally be rotated about a vertical axis and about a horizontal tilt axis relative to a base of the measuring apparatus, so that the telescope can be oriented towards the point to be surveyed by swivelling and tilting. In addition to the optical viewing channel, modern apparatuses often have a camera integrated in the target telescope, and for example oriented coaxially or parallel, for acquiring an image, in which case the acquired image may in particular be represented as a live image on the display of the display/control unit and/or on a display of the peripheral apparatus used for the remote control—for example of the data logger or the remote control unit. The optics of the sighting device may in this case have a manual focus—for example an adjustment screw for changing the position of focusing optics—or an autofocus, the focal position being changed for example by servo motors. Automatic focusing devices for target telescopes of geodetic apparatuses are known, for example, from DE 197 107 22, DE 199 267 06 or DE 199 495 80.

Particularly, the sighting of a target reflector may in this case be carried out by means of a live image, which is displayed to the user in the display of the data logger or of the remote control unit, which is provided by a camera—for example arranged coaxially in the target telescope or with an orientation parallel to the target telescope—as the sighting device of the total station. Accordingly, the user can orientate the total station with the aid of the live image in accordance with the desired target identifiable in the live image.

EP 1 734 336 discloses a surveying system comprising a measurement unit, which has a reflector and an optical receiver and transmitter. It is in this case proposed to use the optical transmitter of the measurement unit inter alia to assist the automatic target search process. Thus, after reception of the search or measurement radiation, the target object can communicate its own identification, for example the reflector number or the reflector type, back to the surveying station with the aid of the transmitter of the measurement unit. The surveying station can therefore identify the target object found and be configured optimally with respect to the target object.

EP 1 573 271 discloses a measurement unit also having an optical transmitter, wherein—after reception of measurement radiation of a surveying apparatus—the measurement unit sends back an optical signal on which the measurement unit's own identity is modulated. A feature common to the aforementioned surveying systems from the prior art is that, optionally with the use of a camera, the measurement unit or a surveying pole provided with the measurement unit is sighted or observed by a stationary position determination unit, for example a total station.

For controlling the surveying system, the user is provided a control unit—either fixedly connected to the surveying apparatus or the measurement unit or embodied as a handholdable remote control unit. Such control units comprise input means and output means, particularly embodied as a display or touchscreen, and data processing and storing means for processing and storing surveying data.

After capturing the coordinates of a measurement point, the user can have the surveying data be visualized graphically on a display of the control unit. However, it would be advantageous to provide a method and a device that provide the surveying data in a geospatial view on the surveying environment to a user.

SUMMARY

Some embodiments of the invention provide a method and/or a surveying system that provide a user with a three-dimensional model of the surroundings of a present surveying task, wherein measurement points are visualized according to their position in the surroundings.

A surveying system according to some embodiments of the invention may have a position determination unit, in particular a total station or a GNSS module, for determining a target position in a defined coordinate system, and a mobile measurement unit for definition and/or position determination of measurement points in the coordinate system. The surveying system comprises a control unit for allowing a user to control a surveying task of the surveying system in a surveying environment in order to acquire surveying task data that is related to the surveying task and comprises spatial coordinates of at least one measurement point, wherein the control unit is adapted as a part of the position determination unit, as a hand-held rugged field device or as a part of the measurement unit. The surveying system is adapted to capture and/or receive environment data of the surveying environment, the environment data being referenced to the coordinate system and particularly comprising point cloud data and/or image data. The control unit comprises a processor unit for processing the surveying task data, a data storage unit for storing the surveying task data and the environment data, and an electronic graphical display for displaying a visualization of the surveying task data to the user. According to some embodiments of the invention, the control unit is adapted to provide a virtual walk-through functionality in a three-dimensional representation of the surveying environment, in the course of which the control unit is adapted to dynamically define a position of a virtual camera based on a determined position of the mobile measurement unit or of the control unit or on a user command, and to dynamically visualize at least a part of the three-dimensional representation of the surveying environment in real-time on the display. The virtual camera is movable through the three-dimensional representation, the movement of the virtual camera depending on a determined movement of the mobile measurement unit or of the control unit or on a user command. The three-dimensional representation comprises at least a representation of the surveying task data and a representation of the environment data.

In some embodiments, an orientation of the virtual camera is defined, wherein defining the position and orientation of the virtual camera is based on a determined position and orientation of the mobile measurement unit or of the control unit or on a user command.

In one embodiment of the surveying system, the mobile measurement unit or the control unit comprises means for determining its current position relative to the coordinate system, particularly by means of GPS or TPS tracking or a simultaneous localization and mapping algorithm, wherein the position of the virtual camera in the three-dimensional representation depends on the position of the mobile measurement unit or the control unit, respectively, relative to the coordinate system, or the visualization comprises visualizing a representation of the position of the mobile measurement unit or the control unit, respectively, in the three-dimensional representation corresponding to the position of the control unit relative to the coordinate system.

In one embodiment of the surveying system, the control unit comprises a data input unit that allows receiving the environment data from an external data storage means, the data input unit particularly being a USB port, a card reader or a wireless communication means.

In a further embodiment, the control unit is a rugged handheld remote control unit, comprising impact-absorbing protectors, a splash-proof and dust-proof housing, and/or shock-resistant electronic components.

In another embodiment, the control unit comprises a digital camera module that is adapted to capture the image data.

In yet another embodiment, the control unit is attachable to the mobile measurement unit.

In one embodiment of the surveying system, the environment data comprises point cloud data that is related to at least one point cloud of the surveying environment, particularly wherein the surveying system comprises a laser scanner that is adapted to capture the point cloud data, and/or image data that is related to at least one image of the surveying environment, particularly wherein the surveying system comprises a digital camera that is adapted to capture the image data, particularly fully automatically during a surveying task, dynamically in real time, and/or upon a user command, and/or additional surveying task data that is related to a previous surveying task in the surveying environment and comprises spatial coordinates of at least one measurement point.

In another embodiment of the surveying system, the position determination unit comprises a targeting device, in particular telescope, wherein the targeting device is pivotable in a motorized manner relative to a base of the position determination unit for the purpose of changing the alignment of said targeting device and has at least one objective unit that defines an optical target axis, angle measuring functionality for high-precision acquisition of the alignment of the target axis, and evaluation means for data storage and control of the alignment of the targeting device. In particular, the position determination unit is an imaging total station and the targeting device comprises a digital camera that is adapted to capture image data.

In a further embodiment of the surveying system, the mobile measurement unit comprises a surveying pole, the lower end of which can be brought into contact with a measurement point and a target which can be fitted on the surveying pole and the target position of which can be determined with high precision. In particular, the target is formed as a surveying reflector which can be surveyed with the aid of a total station or as a GNSS antenna having a data link to the position determination unit which is embodied as a GNSS module, the GNSS antenna and the GNSS module particularly being provided in a common GNSS unit which can be fitted on the surveying pole. Particularly, the mobile measurement unit comprises a camera module that is adapted to capture image data.

Another aspect of the invention relates to a method for providing data about a surveying environment to a user of a surveying system, the surveying system having a position determination unit, in particular a total station or a GNSS module, for determining a target position in a defined coordinate system, a mobile measurement unit for definition and/or position determination of measurement points in the coordinate system, and a control unit for allowing the user to control a surveying task of the surveying system in the surveying environment, wherein the control unit comprises a processor unit, a data storage unit and an electronic graphical display, and is adapted as a component part of the position determination unit, as a hand-held rugged field device or as a component part of the mobile measurement unit. The method comprises acquiring surveying task data that is related to a surveying task of the surveying system in the surveying environment and comprises spatial coordinates of at least one measurement point relative to the coordinate system, capturing and/or receiving environment data of the surveying environment, wherein the environment data is referenced to the coordinate system and particularly comprises point cloud data and/or image data. According to the invention, Some embodiments of the invention may comprise providing a virtual walkthrough functionality in a three-dimensional representation of the surveying environment. The virtual walkthrough functionality comprises dynamically defining a position of a virtual camera based on a determined position of the mobile measurement unit or of the control unit or on a user command, and dynamically visualizing at least a part of the three-dimensional representation of the surveying environment in real-time on the display. The virtual camera is movable through the three-dimensional representation, the movement of the virtual camera depending on a determined movement of the mobile measurement unit or of the control unit or on a user command, and the three-dimensional representation comprises at least a representation of the surveying task data and a representation of the environment data.

In one embodiment, the method according to the invention comprises determining a position of the mobile measurement unit and/or the control unit relative to the coordinate system, particularly by means of GPS or TPS tracking or a simultaneous localization and mapping algorithm, wherein the virtual camera position in the three-dimensional representation depends on the position of the mobile measurement unit and/or the control unit, respectively, relative to the coordinate system, or a representation of the position of the mobile measurement unit and/or the control unit, respectively, is visualized in the three-dimensional representation corresponding to the position of the mobile measurement unit and/or the control unit, respectively, relative to the coordinate system.

In another embodiment, the method according to the invention comprises determining a position of the mobile measurement unit and/or the control unit relative to the coordinate system, particularly by means of GPS or TPS tracking or a simultaneous localization and mapping algorithm, wherein the virtual camera position in the three-dimensional representation depends on the position of a position of the mobile measurement unit and/or the control unit, respectively, relative to the coordinate system, or a representation of the position of a position of the mobile measurement unit and/or the control unit, respectively, is visualized in the three-dimensional representation corresponding to the position of a position of the mobile measurement unit and/or the control unit, respectively, relative to the coordinate system.

In a further embodiment, the method comprises defining at least one point of interest in the three-dimensional representation, continuously determining a distance of the virtual camera position to the point of interest, and switching the position of the virtual camera to a bird's eye perspective on the point of interest, if the distance of the virtual camera position to the point of interest falls below a pre-defined distance threshold. Particularly, the point of interest is a representation of a measurement point and/or defined by a user.

In yet another embodiment, the method comprises visualizing in the three-dimensional representation descriptive data comprising information about at least a part of the surveying task data and/or the environment data, particularly designators or coordinates of measurement points, wherein the descriptive data is visualized next to a representation of a measurement point, point cloud or image the information data comprises information about, and/or upon a user command. Particularly, the user command is a selection of a representation of a measurement point, point cloud or image in the three-dimensional representation, and descriptive data of the selected representation of a measurement point, point cloud or image is displayed.

In one embodiment of the method according to the invention, the environment data comprises point cloud data that is related to at least one point cloud of the surveying environment, particularly wherein the method comprises capturing the point cloud data with a laser scanner, and/or image data that is related to at least one image of the surveying environment, particularly wherein the method comprises capturing the image data with a digital camera, particularly fully automatically during a surveying task, dynamically in real time, and/or upon a user command, and/or additional surveying task data that is related to a previous surveying task in the surveying environment and comprises spatial coordinates of at least one measurement point.

In another embodiment of the method according to the invention, the control unit is a rugged hand-held remote control unit comprising impact-absorbing protectors, a splash-proof and dust-proof housing, and/or shock-resistant electronic components, particularly being attachable to the mobile measurement unit, and/or comprising a digital camera module, wherein the method comprises capturing image data as environment data with the digital camera module of the control unit.

In yet another embodiment, the method comprises receiving the environment data at least partially from an external data storage means via a data input unit of the control unit, particularly a USB port, a card reader or a wireless communication means.

Some embodiments of the invention also relate to a computer program product comprising program code which is stored on a machine-readable medium, or being embodied by an electromagnetic wave comprising a program code segment, and having computer-executable instructions for performing, in particular when run on a control unit of a surveying system according to the invention, the virtual walkthrough functionality of the method according to the invention.

BRIEF DESCRIPTION OF THE FIGURES

The invention in the following will be described in detail by referring to example embodiments that are accompanied by figures, in which.

DETAILED DESCRIPTION

Figure 1:
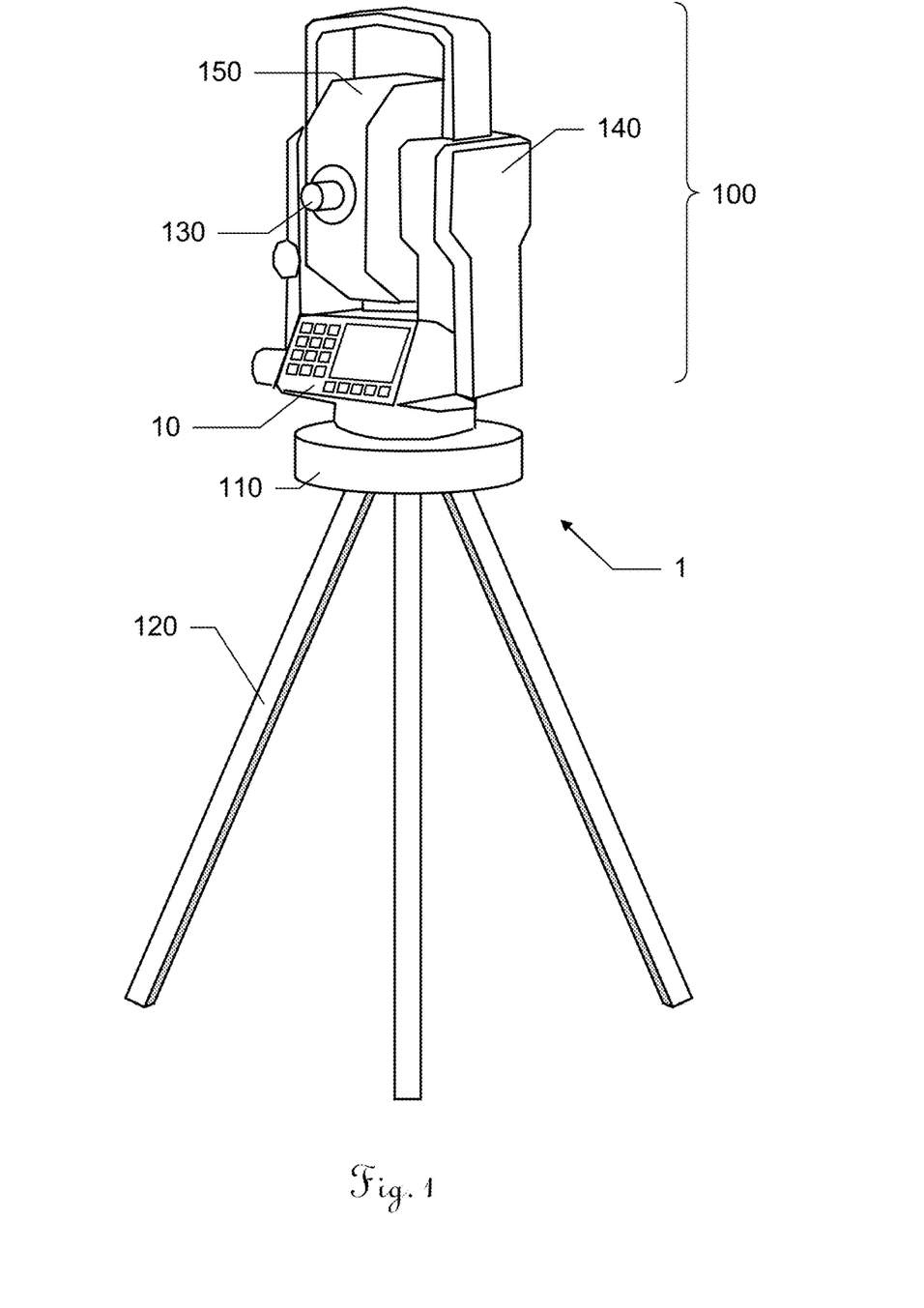
FIG. 1 shows a total station as an example embodiment of a position determination unit of a surveying system according to the invention.

FIG. 1 shows a position determination unit 1 of a surveying system according to the invention that is designed as a total station and serves for measuring horizontal angles, vertical angles and distances with respect to a remote target object.

The total station is arranged on a stand 120, wherein a base 110 of the total station is directly and fixedly connected to the stand. The main body of the total station, which is also designated as the upper part 100, is rotatable about a vertical axis relative to the base 110. In this case, the upper part 100 has a support 140, formed e. g. by two columns, a sighting device 150, for example a telescope, which is mounted in a manner rotatable about the horizontal tilting axis between the columns, and an electronic display control unit 10. The display control unit 10 can be designed in a known manner for controlling the measuring appliance 1 and for processing, displaying and storing measurement data.

The sighting device 150 is arranged on the support 140 in a manner rotatable about a horizontal tilting axis and can thus be pivoted or tilted horizontally and vertically relative to the base 110 for alignment with a target object. Motors (not illustrated here) are present for carrying out necessary pivoting and tilting movements for the alignment of the sighting device. The sighting device 150 can be embodied as a common sighting device structural unit, wherein an objective, a focusing optical system, a coaxial camera sensor, the eyepiece 130 and a graphics processor can be integrated in a common sighting device housing. By means of the sighting device 150, the target object can be targeted and the distance between the total station and the target object can be acquired in an electrical-sensor-based manner. Furthermore, provision is made of means for the electrical-sensor-based acquisition of the angular alignment of the upper part 100 relative to the base 110 and of the sighting device 150 relative to the support 140. These measurement data acquired in an electrical-sensor-based manner are fed to the display control unit 10 and processed by the latter, such that the position of the measurement point relative to the total station can be determined, optically displayed and stored by the display control unit 10.

Figure 2:
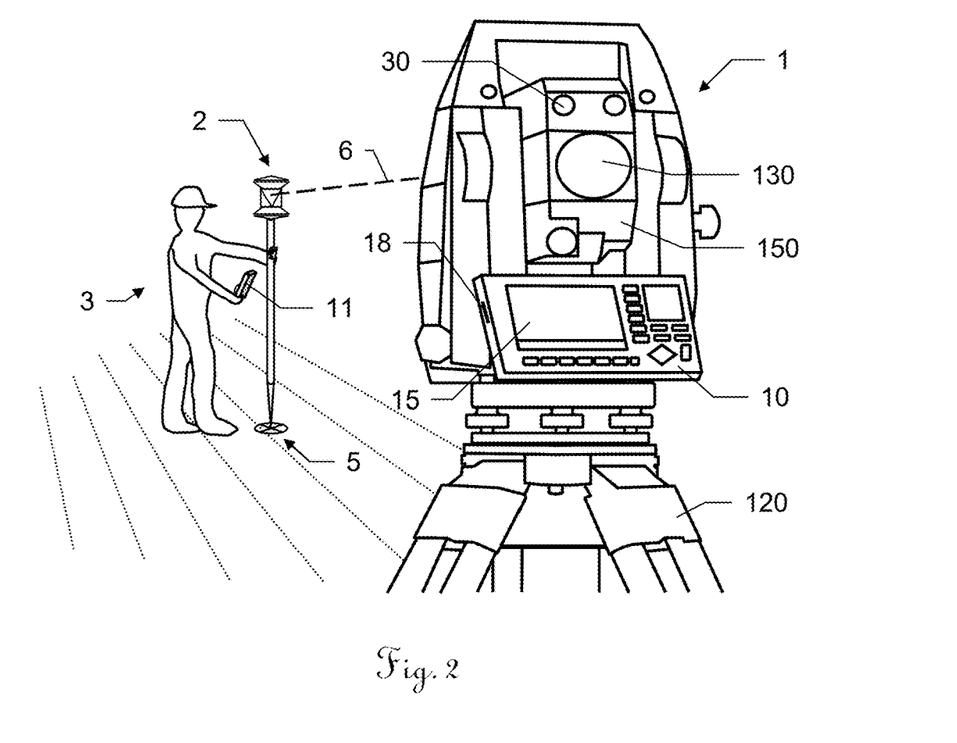
FIG. 2 shows an example embodiment of a surveying system comprising a control unit.

FIG. 2 shows a surveying system according to the invention comprising a position determination unit 1 that is designed as a total station and a measurement unit 2.

The measurement unit 2 comprises a surveying pole, the lower end of which can be brought into contact with a measurement point 5, and a target formed as a surveying reflector which can be fitted on the surveying pole, be surveyed with the aid of the total station 1, and the position of which can be determined with high precision. Alternatively, the target can be a GNSS antenna having a data link to a GNSS module of the position determination unit of the surveying system.

The total station 1 comprises a targeting device 150, in particular a telescope, which is pivotable in a motorized manner relative to a base 110 of the total station 1 in order to allow changing the alignment of said targeting device 150. The targeting device has an objective unit 130 that defines an optical target axis 6. The total station furthermore comprises angle measuring functionality for high-precision acquisition of the alignment of the target axis 6, and evaluation means for data storage and control of the alignment of the targeting device 150.

A control unit of the surveying system according to the invention can be provided as a fixed control unit 10 that is attached to the total station 1, as a hand-held remote control unit 11 or as comprising both two components. In all cases, the control unit 10,11 is adapted for controlling the total station 1 and data interchange with the total station 1. It comprises a displaying means 15, input means, and storing means for storing surveying data. In particular, the displaying means 15 and input means can be provided as a touch screen. If the control unit is provided as two components, the mobile component 11 can comprise the display and a small storing means (e. g. a flash memory), whereas the fixed component 10 can comprise storing means for storing larger quantities of data (e. g. a hard disk drive).

Figure 3:
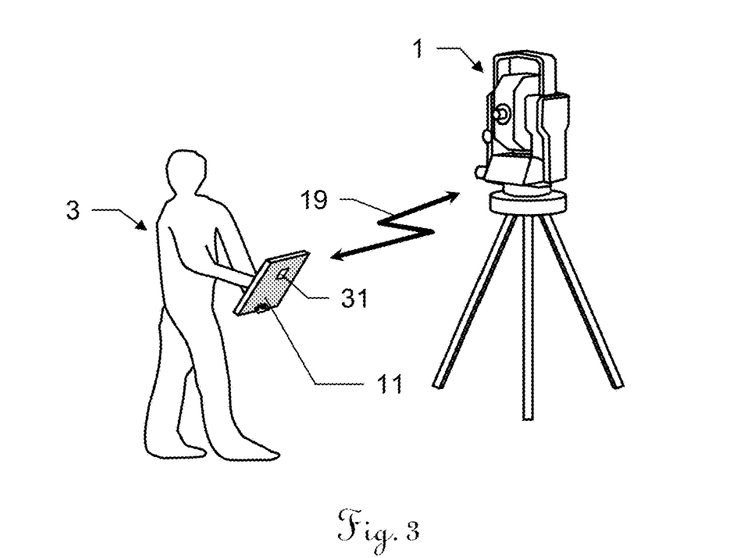
FIG. 3 shows a total station being controlled by a user via a hand-held remote control unit.

FIG. 3 shows a total station 1 being controlled by a user 3 via a cable-less hand-held remote control unit 11 which is connected to the total station 1 by means of a wireless data connection 19, e. g. a mobile broadband or short-wavelength radio link or a wireless local area network. The remote control 11 comprises an integrated digital camera 31, allowing the user 3 to take pictures of the surveying surrounding and of measurement points.

Figure 4A:
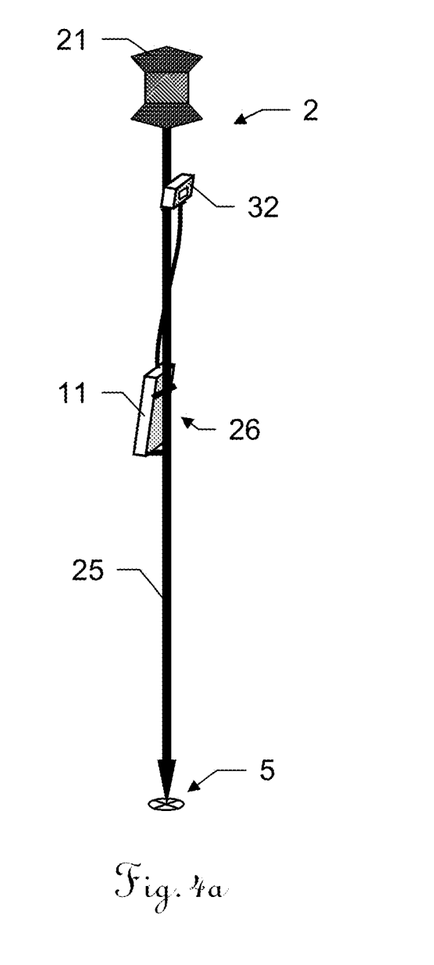
FIGS. 4a-b show two example embodiments of a measurement unit of a surveying system according to the invention.
Figure 4B:
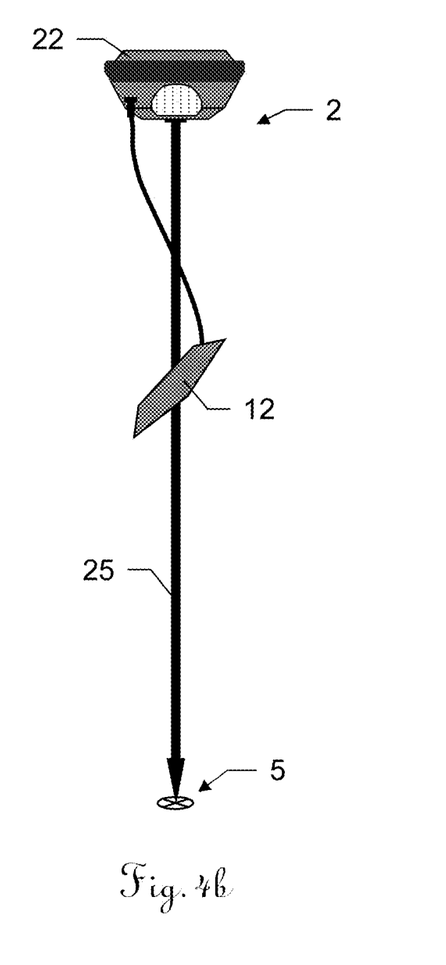

In FIGS. 4a-b two example embodiments of a measurement unit 2 of a surveying system according to the invention are shown. In both embodiments, the measurement unit 2 comprises a surveying pole 25 having a lower end that is adapted to be put in contact with a measurement point 5 the coordinates of which are to be determined. In both embodiments, a target 21,22 is placed on top of surveying pole 25, and the position of the target can be determined with high precision.

FIG. 4a shows a first embodiment, wherein the target is formed as a surveying reflector 21 which can be surveyed with the aid of a total station. The pole 25 comprises a mounting 26 for attaching a hand-held remote control unit 11 for controlling the surveying system. As shown in FIG. 3, the hand-held remote control unit 11 may comprise a camera module. Here, a separate camera module 32 is attached to the pole 25 and connected to the remote control unit 11 via a cable.

The camera module 32 of the measurement unit 2 can be used for capturing image data, e. g. of images depicting a measurement point 5 and its surrounding, particularly before or after placing the pole on the point 5, or a site of a surveying task.

FIG. 4b shows a second embodiment, wherein the target is formed as a GNSS antenna 22 having a data link to a GNSS module of the position determination unit of the surveying system. This embodiment of the measurement unit 2 comprises a control unit 12 that is designed as a part of the measurement unit 2 and attached to the surveying pole

25. It may be connected to the GNSS antenna 22 by means of a cable. Optionally, it may comprise a camera module.

Another embodiment of the measurement unit (not shown here) can also comprise a camera module having an optical recording device that is sensitive to light coming from all or many spatial directions. It could be based on an imaging sensor and a fish-eye lens, or a combination of a camera and a parabolic mirror, or a minimum of two single cameras arranged on a horizontal ring, or any other optical setup functioning as a wide-angle or panorama camera. Such camera modules are described e. g. in the application PCT/EP2014/059138. The camera module can be mounted on the pole together with the position measuring resource of the respective surveying system, or integrated into the housing of the GNSS antenna 22 or of the reflector 21, respectively.

Figure 5A:
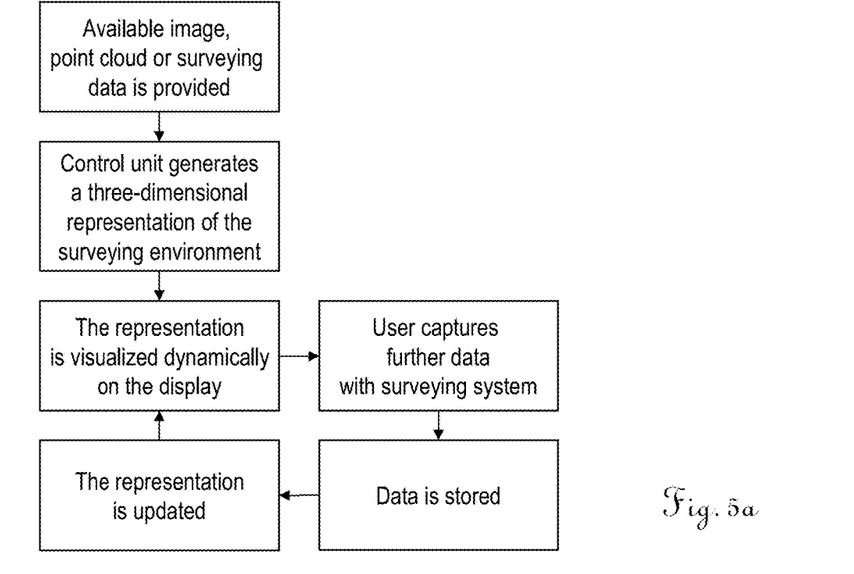
FIGS. 5a-b show flowcharts illustrating two example embodiments of the method according to the invention.
Figure 5B:
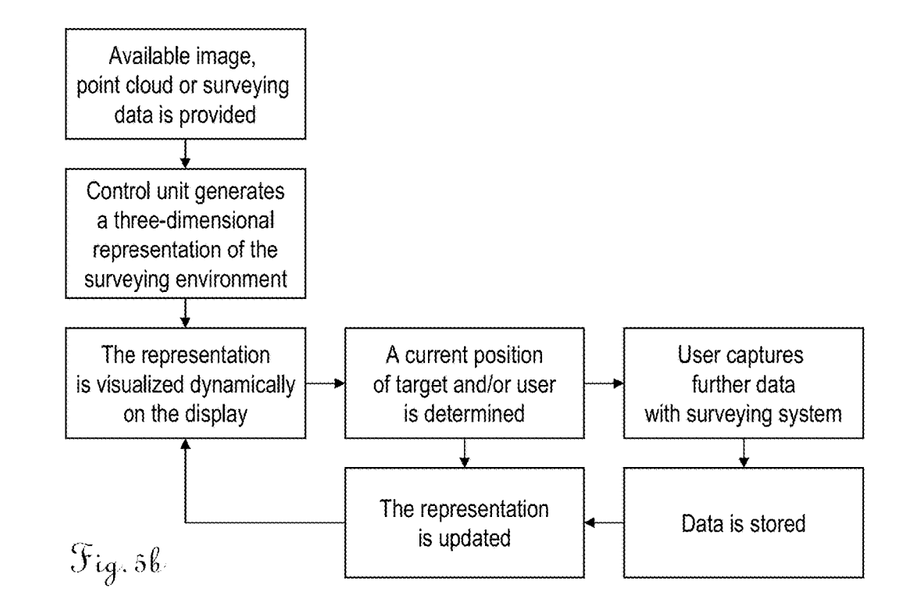

FIGS. 5a and 5b show flow charts illustrating example embodiments of the method according to the invention.

In FIG. 5a, a first example embodiment of the method according to the invention is illustrated.

The method starts with the provision of available environment data, i.e. image data, point cloud data and/or surveying data of the surveying environment in which the user wants to perform a surveying task. The environment data can be provided by external resources, particularly downloaded from a server to the control unit of the surveying system, and/or captured by appropriate devices of the surveying system. The environment data is referenced to a coordinate reference system.

In a next step, based on the environment data, the control unit generates a three-dimensional representation of the surveying environment. This three-dimensional representation is then provided to the user on the display of the control unit. The user then begins the surveying task and captures surveying task data with the surveying system, the surveying task data being referenced to the same coordinate reference system. The captured data is stored in a data storage unit of the control unit. Based on the newly captured data, the three-dimensional representation of the surveying environment is updated, particularly adding a representation of a measuring point to the representation. The updated representation is then provided to the user on the display on real-time, and the user can continue with the surveying task.

In FIG. 5b, a second example embodiment of the method according to the invention is illustrated. In this embodiment, the three-dimensional representation comprises a representation of the measurement unit and/or of the user, and/or the representation of the surveying environment is visualized from a viewpoint of the measurement unit or of the user. In contrast to the first embodiment, during the surveying task, a position of the measurement unit and/or of the user performing the surveying task is determined continuously, and the representation is updated not only when new surveying task data is captured but also when a change of the position has been determined.

Figure 6:
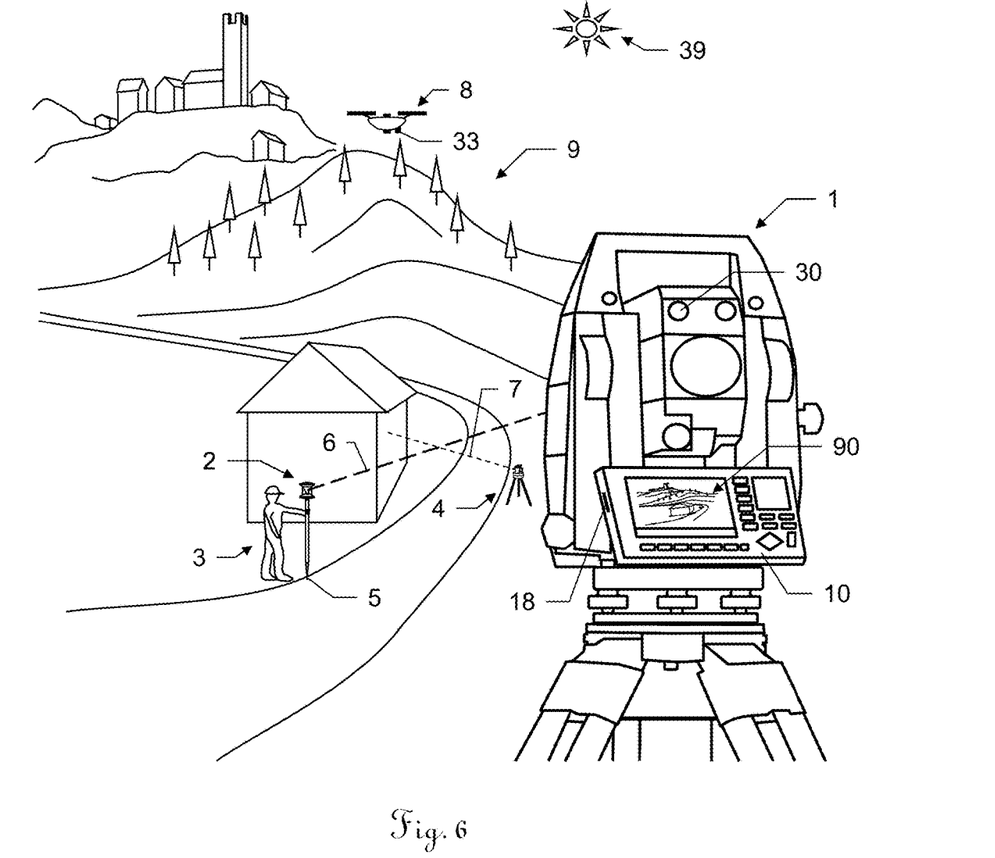
FIG. 6 shows an example embodiment of the surveying system according to the invention in a surveying environment.

FIG. 6 shows an example embodiment of the surveying system according to the invention in a surveying environment 9. It comprises the surveying system as depicted in FIG. 2, having a total station 1 and a measurement unit 2. The total station 1 comprises a camera unit 30 and a control unit with a display, on which a three-dimensional representation 90 of the surveying environment 9 is displayed. The control unit comprises a data input unit 18 that allows receiving additional environment data, i.e. image data, point cloud data or surveying data of the surveying environment, from an external device. In this embodiment, the data input unit is a USB port, but can as well be a card reader or a wireless communication means. The environment data can be product of previous surveying tasks of the same user, or be provided by external sources, e. g. satellite or aerial images or existing point clouds of buildings in the environment.

In this example embodiment, the surveying system furthermore comprises further devices for capturing environment data. These devices comprise a laser scanner unit 4 for capturing point cloud data of parts of the surveying environment 9 by sending out a laser beam 7 in a known manner, and a camera module 33 of an unmanned aerial vehicle (UAV) 8 for capturing image data of parts of the surveying environment 9.

The three dimensional representation 90 can be displayed with a viewpoint of the total station 1, particularly wherein the camera module 30 of the total station 1 can provide live images of the environment 9. Alternatively, the viewpoint can be that of a measurement unit 2 and/or of a user 3 walking through the environment 9 with or without the measurement unit 2. It is also possible, to assign any arbitrarily chosen point as a viewpoint, e. g. the sun 39.

When a camera 30-33 that captures the image data is referenced in the coordinate system, objects and surfaces of the image can be assigned a correct position in the coordinate system by various means. For instance, the camera 30-33 is adapted to capture depth information (e. g. as a stereoscopic or range image camera), or objects and surfaces are identified in the image and matched with known coordinates of points (of a point cloud or of measurement points 5) that are situated in the field of view of the camera 30-33. Objects and surfaces in the image can thus be assigned a more or less accurate distance value to a viewpoint of a three-dimensional representation of the surveying environment.

Figure 7:
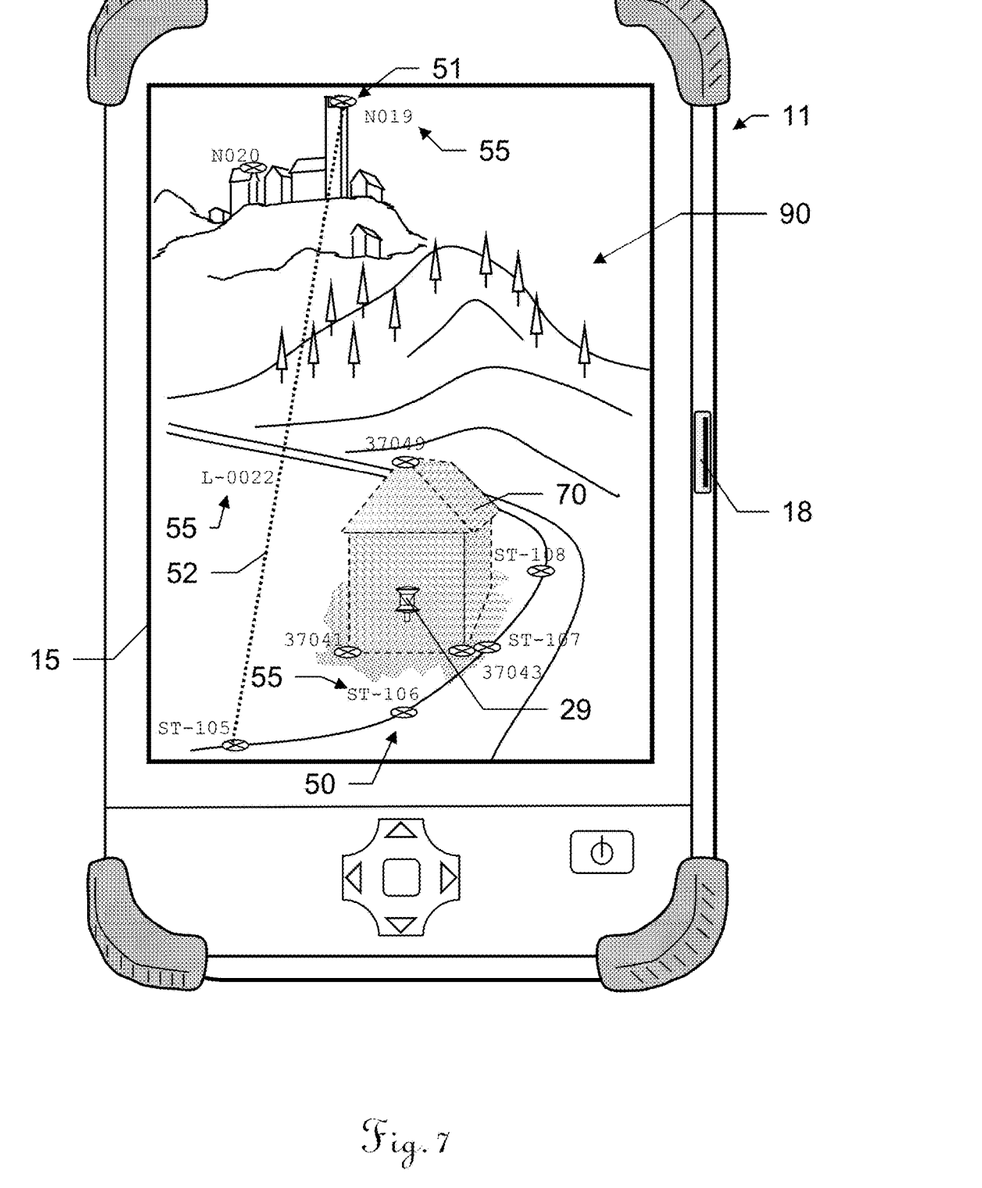
FIG. 7 shows a remote control unit of a surveying system according to the invention being embodied as a hand-held rugged field device having a graphical display showing a three-dimensional representation of a surveying environment.

FIG. 7 shows a control unit of a surveying system according to the invention being embodied as a hand-held rugged field device 11 having a graphical display 15 showing a three-dimensional representation 90 of the surveying environment 9 of FIG. 6. As the device 11 is designed for outdoor application use with measuring and/or surveying equipment in the field, the hand-held field device 11 advantageously is sturdy and resistant to wetness and dust. For improved sturdiness the hand-held rugged field device 11 is, therefore, equipped with impact-absorbing protectors on its edges, a splash-proof and dust-proof housing, and electronic components that are shock-resistant to a certain degree. Preferably, the device 11 is attachable to a measurement unit of the surveying system (see FIG. 4a). It comprises means for establishing a wireless data connection to the total station, e. g. a mobile broadband or short-wavelength radio link or a wireless local area network. The hand-held field device 11 optionally comprises an integrated digital camera, allowing the user to take pictures of the surveying environment or of measurement points.

The three dimensional representation 90 is displayed on the display 15 with the viewpoint being near the total station of FIG. 6. The representation 90 comprises point cloud data 70, image data, surveying data 50 of the present surveying task and surveying data 51 of a previous surveying task. Geometric shapes, based on the surveying data 50,51 can also be visualized, for instance lines 52 or areas. Measurement points of the surveying tasks and geometric shapes are visualized together with descriptive data, in this case an index number 55. The descriptive data can also comprise coordinates of the measurement points or their distance to the actual viewpoint, in the case of a finite line segment, its length—i.e. the distance between two measurement points 50,51—and in the case of an area, its size.

Preferably, the camera unit 30 of the total station is adapted to provide a live image.

Figure 8:
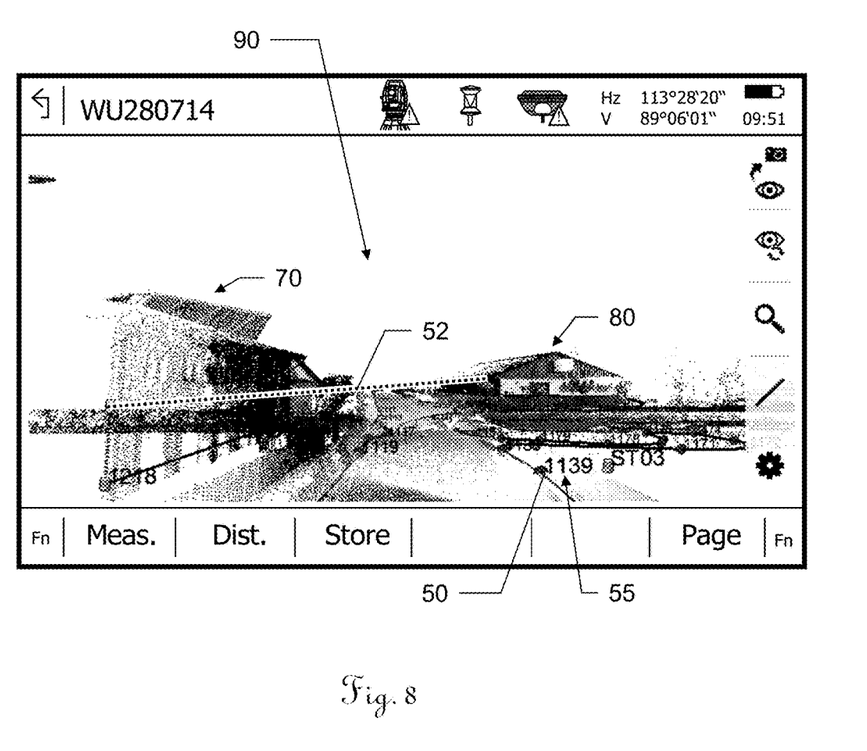
FIG. 8 shows an example of a visual output of a graphical display of a control unit of a surveying system according to the invention, the visual output comprising a three-dimensional representation of a surveying environment.

FIG. 8 shows another example of a visual output of a graphical display of a control unit of a surveying system according to the invention, the visual output comprising a three-dimensional representation 90 of a surveying environment. The three-dimensional representation 90 comprises surveying point data with representations of the surveying points 50 and surveying point designators 55 being displayed. The representation 90 also comprises point cloud data 70 and image data 80.

The combination of a point cloud 70, single point data 50 and image data 80 in the 3D model allows a dynamical 3D visualization of data, based e. g. on the walking direction and speed of a user carrying the measurement unit. These parameters e. g. can be derived from GPS or TPS tracking data, or by means of a SLAM algorithm.

The user can select between a "navigation view mode", and a "site observer mode". In the navigation view mode, the viewpoint depends on the current position of the measurement unit, as for instance realized in many car navigation systems. This mode allows setting a tilting angle to the horizon and the field of view (zoom level). Optionally, the viewpoint and viewing direction can be chosen arbitrarily. This allows the user to have his own position in the field of view and/or to have the virtual camera look sideways or even backward with respect to the moving direction. The site observer mode is static. The view is dynamically updated but not moving together with the user. This mode enables the user to observe his own actions from a remote viewpoint. This remote viewpoint can be a fixed point, such as the position determination unit, or e. g. the sun, as well as any arbitrarily chosen point in the environment. The viewpoint can be changed by a user input, so that for observing the environment, the user can move freely through the 3D model.

In the example depicted in FIG. 8, the "navigation view mode" is shown, i.e. the virtual camera's position corresponds to that of a measurement unit that is operated by the user. The visual output of the control unit corresponds more or less to the user's own perception of the real environment. If the measurement unit is moved, the virtual camera's position will change correspondingly. The user is enabled to change the virtual camera's position by entering a command, for instance changing a relative position of the virtual camera to the position of the target or switching to the "site observer mode".

The user can add a line segment 52 between two points of interest, e. g. for having the distance between these points in the real surveying environment calculated and displayed.

Optionally, if the virtual camera's position approaches a certain point of interest, e. g. a pre-defined measurement point, the virtual camera position can automatically switch to a bird's eye perspective with a bird's eye view of this point of interest. The bird's eye perspective e. g. can be a vertical or almost vertical top-down perspective or an aerial view on the point of interest from a great height. The top-down perspective can be vertical either with respect to the ground (which may be sloped at the point of interest), with respect to a datum plane of the representation 90 of the surveying environment (e. g. wherein the vertical top-down view follows the plumb line) or with respect to a plane which is defined by the user or by a plurality of points of interest. A vertical view, centred on the point of interest and providing an overview over the surrounding of the point can be particularly useful, e. g. to determine dimensions and relative positions of a stake out of a construction site. The user may define the points of interest, and the distance between each of these defined points of interest and the present position of the virtual camera is then monitored. If the distance falls below a pre-defined threshold (e. g. three meters or one meter) the bird's eye view is automatically provided. If the distance then exceeds a certain threshold again (e. g. four meters or 1.5 meters) or upon a user command, the view is switched back to the camera position of the navigation mode.

Although the invention is illustrated above, partly with reference to some preferred embodiments, it must be understood that numerous modifications and combinations of different features of the embodiments can be made. All of these modifications lie within the scope of the appended claims.

What is claimed is:

1. A surveying system having a position determination unit for determining a target position in a defined coordinate system, and having a mobile measurement unit for definition and/or position determination of measurement points in the coordinate system, wherein the surveying system comprises a control unit for allowing a user to control a surveying task of the surveying system in a surveying environment in order to acquire surveying task data that is related to the surveying task and comprises spatial coordinates of at least one measurement point, wherein the control unit is adapted as a hand-held rugged field device or as a part of the mobile measurement unit, the surveying system is adapted to capture and/or receive environment data of the surveying environment, the environment data being referenced to the coordinate system and comprising point cloud data that is related to at least one point cloud of the surveying environment, and the control unit comprises a processor unit for processing the surveying task data, a data storage unit for storing the surveying task data and the environment data, and an electronic graphical display for displaying a visualization of the surveying task data to the user, wherein the control unit is adapted to provide a virtual walkthrough functionality in a three-dimensional representation of the surveying environment, in the course of which virtual walkthrough functionality the control unit is adapted to:

dynamically define a position of a virtual camera based on a determined position of the mobile measurement unit or of the control unit, and dynamically visualize at least a part of the three-dimensional representation of the surveying environment in real-time on the display with a viewpoint arbitrarily chosen in the surveying environment, wherein:

the virtual camera and the viewpoint are movable through the three-dimensional representation, the movement of the virtual camera and the viewpoint depending on a determined movement of the mobile measurement unit or of the control unit, and the three-dimensional representation visualized with the chosen viewpoint comprises at least a representation of the surveying task data and a representation of the environment data.

2. The surveying system according to claim 1, further configured for:

localizing a current position of the mobile measurement unit or the control unit relative to the coordinate system, wherein the position of the virtual camera in the three-dimensional representation depends on the position of the mobile measurement unit or the control unit, respectively, relative to the coordinate system.

3. The surveying system according to claim 1, further configured for:

localizing a current position of the mobile measurement unit or the control unit relative to the coordinate system, wherein the visualization comprises visualizing a representation of the position of the mobile measurement unit or the control unit, respectively, in the three-dimensional representation corresponding to the position of the mobile measurement unit or the control unit, respectively relative to the coordinate system.

4. The surveying system according to claim 1, wherein the control unit comprises a data input unit that allows receiving the environment data from an external data storage device is a rugged hand-held remote control unit, comprising impact-absorbing protectors, a splash-proof and dust-proof housing, and/or shock-resistant electronic components, comprises a digital camera module that is adapted to capture the image data, and/or is attachable to the mobile measurement unit.

5. The surveying system according to claim 1, wherein the surveying system comprises a laser scanner that is adapted to capture the point cloud data, and/or the environment data comprises image data that is related to at least one image of the surveying environment, wherein the surveying system comprises a digital camera that is adapted to capture the image data dynamically in real time, and/or upon a user command, and/or the environment data comprises additional surveying task data that is related to a previous surveying task in the surveying environment and comprises spatial coordinates of at least one measurement point.

6. The surveying system according to claim 1, wherein the position determination unit comprises:

a targeting device wherein the targeting device is pivotable in a motorized manner relative to a base of the position determination unit for the purpose of changing the alignment of said targeting device and has at least one objective unit that defines an optical target axis, angle measuring functionality for high-precision acquisition of the alignment of the target axis, and evaluation functionality for data storage and control of the alignment of the targeting device.

7. The surveying system according to claim 6, wherein the position determination unit is an imaging total station and the targeting device comprises a digital camera that is adapted to capture image data.

8. The surveying system according to claim 1, wherein the mobile measurement unit comprises:

a surveying pole, the lower end of which can be brought into contact with a measurement point, and a target which can be fitted on the surveying pole and the target position of which can be determined with high precision, wherein the target is formed as a surveying reflector which can be surveyed with the aid of a total station.

9. The surveying system according to claim 1, wherein the mobile measurement unit comprises:

a surveying pole, the lower end of which can be brought into contact with a measurement point, and a target which can be fitted on the surveying pole and the target position of which can be determined with high precision, wherein the target is formed as a GNSS antenna having a data link to the position determination unit which is embodied as a GNSS module, the GNSS antenna and the GNSS module being provided in a common GNSS unit which can be fitted on the surveying pole.

10. The surveying system according to claim 1, wherein the mobile measurement unit comprises a camera module that is adapted to capture image data.

11. A method for providing data about a surveying environment to a user of a surveying system, the surveying system having a position determination unit for determining a target position in a defined coordinate system, a mobile measurement unit for definition and/or position determination of measurement points in the coordinate system, and a control unit for allowing the user to control a surveying task of the surveying system in the surveying environment, wherein the control unit comprises a processor unit, a data storage unit and an electronic graphical display, and is adapted as a hand-held rugged field device or as a component part of the mobile measurement unit, the method comprising:

acquiring surveying task data that is related to a surveying task of the surveying system in the surveying environment and comprises spatial coordinates of at least one measurement point relative to the coordinate system, capturing and/or receiving environment data of the surveying environment, wherein the environment data is referenced to the coordinate system and comprising point cloud data that is related to at least one point cloud of the surveying environment, providing a virtual walkthrough functionality in a three-dimensional representation of the surveying environment, the virtual walkthrough functionality comprising:

dynamically defining a position of a virtual camera based on a determined position of the mobile measurement unit or of the control unit, and dynamically visualizing at least a part of the three-dimensional representation of the surveying environment in real-time on the display with a viewpoint arbitrarily chosen in the surveying environment, wherein:

the virtual camera and the viewpoint are movable through the three-dimensional representation, the movement of the virtual camera and the viewpoint depending on a determined movement of the mobile measurement unit or of the control unit, and the three-dimensional representation visualized with the chosen viewpoint comprises at least a representation of the surveying task data and a representation of the environment data.

12. The method according to claim 11, further comprising:

determining a position of the mobile measurement unit and/or the control unit relative to the coordinate system, by means of GPS or TPS tracking or a simultaneous localization and mapping algorithm, wherein the virtual camera position in the three-dimensional representation depends on the position of the mobile measurement unit and/or the control unit, respectively, relative to the coordinate system.

13. The method according to claim 11, further comprising:
determining a position of the mobile measurement unit and/or the control unit relative to the coordinate system, by means of GPS or TPS tracking or a simultaneous localization and mapping algorithm, wherein
a representation of a position of the mobile measurement unit and/or the control unit, respectively, is visualized in the three-dimensional representation corresponding to a position of the mobile measurement unit and/or the control unit, respectively, relative to the coordinate system.

14. The method according to claim 11, further comprising:
defining at least one point of interest in the three-dimensional representation,
continuously determining a distance of the virtual camera position to the point of interest, and
switching the position and orientation of the virtual camera to a bird's eye perspective on the point of interest, if the distance of the virtual camera position to the point of interest falls below a pre-defined distance threshold, wherein
the bird's eye perspective is a vertical top-down view of the point of interest, and/or
the point of interest is a representation of a measurement point and/or defined by a user.

15. The method according to claim 11, further comprising:
visualizing in the three-dimensional representation descriptive data comprising information about at least a part of the surveying task data and/or the environment data, wherein the descriptive data is visualized:
next to a representation of a measurement point, point cloud or image the information data comprises information about, and/or
upon a user command, wherein:
the user command is a selection of a representation of a measurement point, point cloud or image in the three-dimensional representation, and
descriptive data of the selected representation of a measurement point, point cloud or image is displayed.

16. The method according to claim 11
wherein the method comprises capturing the point cloud data with a laser scanner.

17. The method according to claim 11, wherein:
the control unit is a rugged hand-held remote control unit comprising impact-absorbing protectors, a splash-proof and dust-proof housing, and/or shock-resistant electronic components:
being attachable to the mobile measurement unit, and/or
comprising a digital camera module, wherein the method comprises capturing image data as environment data with the digital camera module of the control unit.

18. The method according to claim 11, further comprising:
receiving the environment data at least partially from an external data storage means via a data input unit of the control unit.

19. A non-transitory computer program product, comprising program code which is stored on a machine-readable medium comprising a program code segment, and having computer-executable instructions for performing the virtual walkthrough functionality of the method according to claim 11.

20. The method according to claim 11, wherein the environment data comprises image data that is related to at least one image of the surveying environment, wherein the method comprises capturing the image data with a digital camera dynamically in real time, and/or upon a user command.

21. The method according to claim 11, wherein the environment data comprises additional surveying task data that is related to a previous surveying task in the surveying environment and comprises spatial coordinates of at least one measurement point.

* * * * *